United States Patent [19]

Nagy

[11] 4,005,425
[45] Jan. 25, 1977

[54] DUAL QUADRATURE POLARIZATION RADAR SYSTEM
[75] Inventor: Louis L. Nagy, Warren, Mich.
[73] Assignee: General Motors Corporation, Detroit, Mich.
[22] Filed: Nov. 14, 1975
[21] Appl. No.: 631,852
[52] U.S. Cl. .......................... 343/17.7; 343/100 PE
[51] Int. Cl.$^2$ .......................................... G01S 7/40
[58] Field of Search ..................... 343/17.7, 100 PE
[56] References Cited
UNITED STATES PATENTS 3,225,295  12/1965  Altman et al. ................. 343/17.7 X
3,827,051  7/1974  Foldes ..................... 343/100 PE X Primary Examiner—T.H. Tubbesing
Attorney, Agent, or Firm—Howard N. Conkey

[57] ABSTRACT

A radar system provides a measurement of the co-linear and cross-polarization characteristics of a radar target. Vertically and horizontally polarized RF signals are selectively transmitted to a target and the co-linear and cross-polarized RF returns from the target are detected with each return being coupled to an output switch which is selectively operated to provide an output RF signal for providing either the co-linear or cross-polarized RF return. RF null circuits are provided for nulling internal system RF reflections for both co-linear and cross-polarized returns when either polarized signal is transmitted.

2 Claims, 2 Drawing Figures 4,005,425

DUAL QUADRATURE POLARIZATION RADAR SYSTEM

This invention is directed to a radar system for providing a measurement of the co-linear and cross-polarized characteristics of a radar target.

In some radar system applications, such as radar systems for automobiles, it may be desirable to provide information representing or relating to the characteristics of a target or object detected by the radar system. This information then may be used to evaluate the detected target or object.

Much of the information required for a radar system to evaluate a target must come from characteristics which can be measured by the radar system itself. The general object of this invention is to provide a radar system which provides a measurement of the co-linear and cross-polarization scattering characteristic of a target, which characteristics may then be utilized to evaluate the target.

It is another object of this invention to provide for a radar system for providing a measurement of the co-linear and cross-polarization scattering characteristic of a target which is free from residual RF reflections within the radar system.

It is another object of this invention to provide for a dual quadrature polarization monostatic microwave radar system selectively operable to provide RF co-linear and cross-polarization scattering characteristics of a target wherein the system is free from residual RF reflections.

Figure 1:
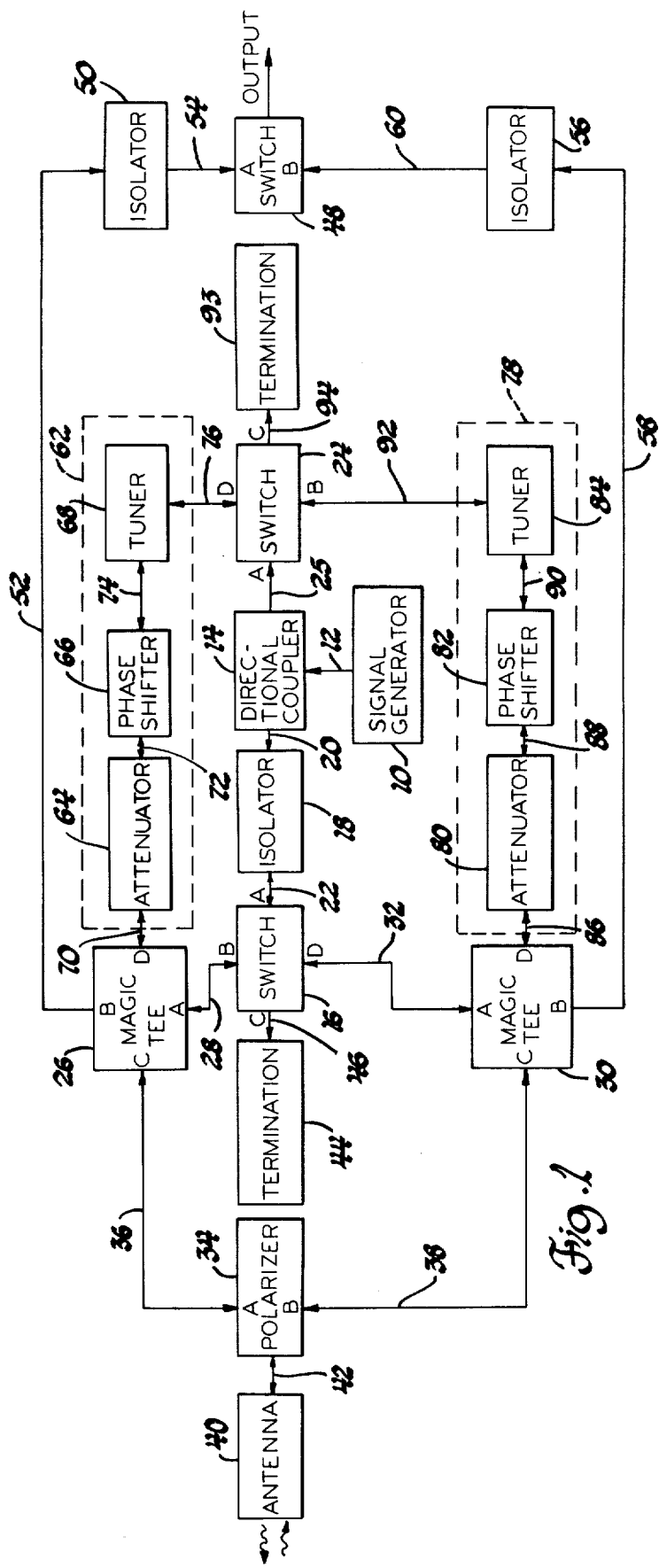
Figure 2:
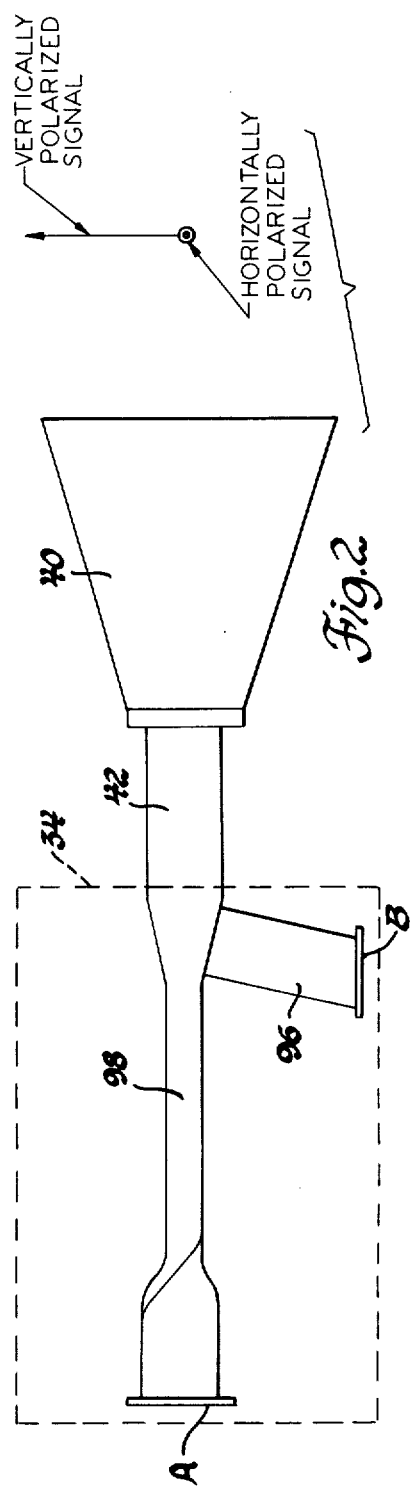

These and other objects of this invention may be best understood by reference to the following description of a preferred embodiment and the drawings wherein:

FIG. 1 is a system diagram of the invention for providing a measurement of the co-linear and cross-polarization scattering characteristics of a radar target and FIG. 2 is a drawing of an antenna and a dual polarizing antenna feed system therefor for use in the system of FIG. 1.

Referring to FIG. 1, and RF signal generator 10 generates an RF signal (at, for example, 10.525 GHz) which is directed by an RF coupler 12 to a directional coupler 14. RF energy from the signal generator 10 is directed to port A of a four port wave guide switch 16 having ports A, B, C and D by means of the directional coupler 14, an isolator 18, and RF couplers 20 and 22.

The directional coupler 14 also directs RF energy from the signal generator 10 to port A of a four port wave guide switch 24 having ports A, B, C and D through an RF coupler 25.

The wave guide switches 16 and 24 are identical and may take the form of any well known selectively operable wave guide switches either mechanical or electrical which are selectively operable to RF couple ports A and B and RF couple ports C and D or to RF couple ports A and D and RF couple ports B and C.

A magic tee 26 having ports A, B, C and D has port A thereof coupled to port B of the wave guide switch 16 by an RF coupler 28. A magic tee 30 having ports A, B, C and D has port A thereof coupled to port D of the wave guide switch 16 by an RF coupler 32. Each of the magic tees 26 and 30 functions to couple equal portions of RF inputs to the ports A and B to the ports C and D and couple equal portions of RF inputs to the ports C and D to the ports A and B.

RF energy from port C of the magic tee 26 is coupled to port A of a polarizer 34 by an RF coupler 36. Port C of the magic tee 30 is coupled to a port B of the polarizer 34 by an RF coupler 38.

The polarizer 34 functions to vertically polarize RF signal coupled to the port A from the magic tee 26 and couple the vertically polarized RF signal to an antenna 40 through an RF coupler 42 and to horizontally polarize RF signals supplied to the port B thereof from the magic tee 30 and couple the horizontally polarized signal to the antenna 40 through the RF coupler 42. The polarizer 34 further functions to couple vertically polarized RF signals received by the antenna 40 to the port C of the magic tee 26 through the RF coupler 36 and to couple horizontally polarized RF signals received by the antenna 40 to port C of the magic tee 30 through the RF coupler 38.

By selective operation of the wave guide switch 16, vertically or horizontally polarized RF signals may be selectively transmitted by the antenna 40. Further, when the wave guide switch 16 is operated to couple RF energy to port A of the magic tee 26 to effect transmission of vertically polarized RF signals by the antenna 40, the co-linear (vertically polarized) RF signal received by the antenna 40 from a target is coupled to the port C of the magic tee 26 and the cross-polarized (horizontally polarized) RF signal, which is orthogonal to the transmitted polarized signal, received by the antenna 40 from the target is coupled to the port C of the magic tee 30. Conversely, when the wave guide switch 16 is selectively operated to couple RF energy to port A of the magic tee 30 to effect transmission of horizontally polarized RF signals by the antenna 40, the co-linear (horizontally polarized) RF signal received by the antenna 40 from a target is coupled to the port C of the magic tee 30 and the cross-polarized (vertically polarized) RF signal, which is orthogonal to the transmitted polarized signal, received by the antenna 40 from the target is coupled to port C of the magic tee 26.

The RF energy coupled from the antenna 40 through the polarizer 34 and to the magic tees 26 and 30 is equally divided and coupled to the ports A and B of the respective magic tee 26 and 30. When the wave guide switch 16 is operated to RF couple its ports A and B and RF couple its ports C and D, the RF energy from port A of the magic tee 26 coupled to port B of the wave guide switch 16 by the RF coupler 28 is absorbed by the isolator 18 and the RF energy from port A of the magic tee 30 coupled to port D of the wave guide switch 16 by the RF coupler 32 is absorbed by a termination 44 which is RF coupled to port C of the wave guide switch 16 by an RF coupler 46. When the wave guide switch 16 is selectively operated to RF couple the ports A and D and RF couple the ports B and C, RF energy from port A of the magic tee 26 coupled to port B of the wave guide switch 16 by the RF coupler 28 is absorbed by the termination 44 and RF energy from port A of the magic tee 30 coupled to port D of the wave guide switch 16 by the RF coupler 32 is absorbed by the isolator 18.

Port B of the magic tee 26 is coupled to an input port A of a wave guide switch 48 through an isolator 50 and RF couplers 52 and 54. Port B of the magic tee 30 is coupled to an input port B of the wave guide switch 48 through an isolator 56 and RF couplers 58 and 60.

A null circuit 62 includes an attenuator 64, a phase shifter 66 and a tuner 68 series coupled between port D of the magic tee 26 and port D of the wave guide switch 24 by RF couplers 70, 72, 74 and 76. A null circuit 78 includes an attenuator 80, a phase shifter 82 and a tuner 84 series coupled between port D of the magic tee 30 and port B of the wave guide switch 24 by RF couplers 86, 88, 90 and 92. Port C of the wave guide switch 24 is coupled to a termination 93 by an RF coupler 94.

The null circuit 62 provides a co-linear RF null signal to port D of the magic tee 26 when the radar system transmits a vertically polarized RF signal and provides a cross-polarized null signal to port D of the magic tee 26 when the radar system is transmitting horizontally polarized RF signals.

The null circuit 78 provides a co-linear RF null signal to port D of the magic tee 30 when the radar system transmits a horizontally polarized RF signal and provides a cross-polarized null signal to port D of the magic tee 30 when the radar system transmits vertically polarized RF signals. In this regard, the wave guide switches 16 and 24 are simultaneously switched so that the ports A and B of each of the switches 16 and 24 are simultaneously RF coupled and the ports C and D of each of the switches 16 and 24 are simultaneously RF coupled.

When the wave guide switches 16 and 24 are selectively switched to couple RF signals from the RF signal generator 10 to the antenna 40 through port A of the polarizer 34 to transmit vertically polarized RF signals, the portion of the RF signal emerging from port D of the magic tee 26 travels through the attenuator 64, the phase shifter 66 and is reflected from the tuner 68 (which may take the form of a triple slug tuner) back to the port D of the magic tee 26. The portion of this reflected signal which is coupled to port B of the magic tee 26 is the co-linear null signal which is summed at port B with vertically polarized signals received from a target when vertically polarized RF signals are being transmitted. By proper adjustment of the attenuator 64, the phase shifter 66 and the tuner 68 when no RF signals are being received by the antenna 40, this co-linear RF null signal is made to cancel the residual RF reflections in the system so as to maximize the system sensitivity to the vertically polarized return from a target. At the same time, RF signals from the signal generator 10 are coupled by the wave guide switch 24 to port D of the magic tee 30 through the tuner 84 (which may take the form of a triple slug tuner), the phase shifter 82 and the attenuator 80. The portion of this RF signal which is coupled to the port B of the magic tee 30 comprises the cross polarized null signal which is summed at port B with horizontally polarized signals from a target when vertically polarized RF signals are being transmitted. By proper adjustment of the attenuator 80, the phase shifter 82 and the tuner 84, this cross-polarized null signal is made to cancel the residual RF reflections in the system so as to maximize system sensitivity to the cross-polarized return from a target while vertically polarized RF signals are being transmitted.

When the wave guide switches 16 and 24 are selectively switched to couple RF signals from the RF signal generator 10 to the antenna 40 through port B of polarizer 34 to transmit horizontally polarized RF signals, the portion of the RF signal emerging from port D of the magic tee 30 travels through the attenuator 80, the phase shifter 82 and is reflected from the tuner 84 back to port D of the magic tee 30. The portion of this reflected signal which is coupled to the port B of the magic tee 30 is the co-linear null signal which is summed at port B with horizontally polarized signals received from a target when horizontally polarized RF signals are being transmitted. By proper adjustment of the attenuator 80, the phase shifter 82 and the tuner 84 when no signals are being received by the antenna 40, this co-linear RF null signal is made to cancel the residual RF reflections in the system so as to maximize the system sensitivity to the horizontally polarized return from the target. At the same time, RF signals from the RF signal generator 10 are coupled by the wave guide switch 24 to the port D of the magic tee 26 through the tuner 68, the phase shifter 66 and the attenuator 64. The portion of this RF signal which is coupled to the port B of the magic tee 26 is the cross-polarized null signal which is summed at port B with vertically polarized signals received from a target when horizontally polarized RF signals are being transmitted. By proper adjustment of the attenuator 64, phase shifter 66 and the tuner 68, this signal is made to cancel the residual RF reflections in the system so as to maximize system sensitivity to the cross-polarized return from a target when horizontally polarized signals are being transmitted.

Each of the null circuits 62 and 78 functions to provide null signals for either the cross-polarized or co-linear return as a function of the selective switching of the wave guide switches 16 and 24. By proper adjustment of the respective attentuators, phase shifters and tuners, cancellation of the residual RF reflections in the system and maximization of co-linear and cross-polarized sensitivity is achieved.

The RF signal outputs from port B of each of the magic tees 26 and 30 are the co-linear and cross-polarized RF signals received from a target and which may be used as a measurement of co-linear and cross-polarization scattering characteristics of a target. The wave guide switch 48 is selectively switched to selectively couple the RF input to port A or port B to its output so as to selectively provide the co-linear or cross-polarized RF returns from the radar target when either vertically or horizontally polarized RF signals are being transmitted by the antenna 40.

Referring to FIG. 2, there is illustrated the polarizer 34 for supplying vertically or horizontally polarized RF signals to the antenna 40. A seen in FIG. 2, RF signals from the RF coupler 38 to FIG. 1 are coupled to port B of a rectangular wave guide section 96 horizontally oriented. This rectangular wave guide horizontally polarizes the RF signals coupled thereto which horizontally polarize RF energy is coupled to the antenna 40 by the RF coupler 42. RF signals from the RF coupler 36 are coupled to port A of a rectangular wave guide section 98. The wave guide section 98 is rectangular and initially horizontally oriented. The wave guide section 98 is twisted so as to orient the polarized RF signal vertically relative to the polarized signal from the wave guide 96. This vertically polarized RF signal is coupled to the antenna 40 by the RF coupler 42.

What has been described is a radar system for providing a measurement of the co-linear and cross-polarized scattering characteristics of a target wherein either vertically or horizontally polarized RF signals are transmitted and the cross-polarized and co-linear returns may be selectively provided at an output to provide a measurement of the scattering characteristics of the target which is unaffected by residual RF signal reflections within the radar system.

It is claimed:

1. A dual quadrature polarization radar system for measuring the co-linear and cross-polarization characteristics of a target, comprising:

an RF generator effective to generate an RF signal;

first and second magic tees, each magic tee having first, second, third and fourth ports and being effective to couple equal portions of RF inputs to the first and third ports to the second and fourth ports and couple equal portions of RF inputs to the second and fourth ports to the first and third ports;

a first RF switch RF coupled to the RF generator and the first port of each of the first and second magic tees, the first RF switch being selectively operable to couple the RF signal generated by the RF generator to a selected one of the first ports of the first and second magic tees;

an RF antenna effective to transmit RF signals toward a target and receive reflected RF signals from the target;

an RF signal polarizer including a first portion RF coupled between the third port of the first magic tee and the RF antenna and effective to vertically polarize and couple RF signals from the third port of the first magic tee to the RF antenna and couple vertically polarized RF signals from the RF antenna to the third port of the first magic tee and a second portion RF coupled between the third port of the second magic tee and the RF antenna and effective to horizontally polarize and couple RF signals from the third port of the second magic tee to the RF antenna and couple horizontally polarized RF signals from the RF antenna to the third port of the second magic tee;

a second RF switch RF coupled to the second port of each of the first and second magic tees, the second RF switch having an output port and being selectively operable to couple RF signals from a selected one of the second ports of the first and second magic tees to the output port;

means effective to generate and couple a first co-linear RF null signal to the fourth port of the first magic tee when the first RF switch is selectively operated to couple the RF signal from the RF generator to the first port of the first magic tee and to generate and couple a first cross-polarized RF null signal to the fouth port of the first magic tee when the first RF switch is selectively operated to couple the RF signal from the RF generator to the first port of the second magic tee, the first co-linear RF null signal being effective to cancel residual RF reflections when the first RF switch is selectively operated to couple the RF signal from the RF generator to the first magic tee and the first cross-polarized RF null signal being effective to cancel residual RF reflections when the first RF switch is selectively operated to couple the RF signal from the RF generator to the second magic tee; and means effective to generate and couple a second co-linear RF null signal to the fourth port of the second magic tee when the first RF switch is selectively operated to couple the RF signal from the RF generator to the first port of the second magic tee and to generate and couple a second cross-polarized RF null signal to the fourth port of the first magic tee when the first RF switch is operated to selectively couple the RF signal from the RF generator to the first port of the second magic tee, the second co-linear RF null signal being effective to cancel residual RF reflections when the first RF switch is selectively operated to couple the RF signal from the RF generator to the second magic tee and the second cross-polarized RF null signal being effective to cancel residual RF reflections when the first RF switch is selectively operated to couple the RF signal from the RF generator to the second magic tee, whereby selective operation of the first and second RF switches provides an RF output from the output port of the second RF switch which selectively provides a measurement of the co-linear and cross-polarization characteristics of the target wherein the RF signal at the output of the second RF switch is free from residual RF reflections in the radar system for each of the vertical, horizontal and cross-polarization measurements.

2. A dual quadrature polarization radar system for measuring the co-linear and cross-polarization characteristics of a target, comprising:

an RF generator effective to generate an RF signal;

first and second magic tees, each magic tee having first, second, third and fourth ports and being effective to couple equal portions of RF imputs to the first and third ports to the second and fourth ports and couple equal portions of RF inputs to the second and fourth ports to the first and third ports;

a first RF switch RF coupled to the RF generator and the first port of each of the first and second magic tees, the first RF switch being selectively operable to couple the RF signal generated by the RF generator to a selected one of the first ports of the first and second magic tees;

an RF antenna effective to transmit RF signals toward a target and receive reflected RF signals from the target;

an RF signal polarizer including a first portion RF coupled between the third port of the first magic tee and the RF antenna and effective to vertically polarize and couple RF signals from the third port of the first magic tee to the RF antenna and couple vertically polarized RF signals from the RF antenna to the third port of the first magic tee and a second portion RF coupled between the third port of the second magic tee and the RF antenna and effective to horizontally polarize and couple RF signals from the third port of the second magic tee to the RF antenna and couple horizontally polarized RF signals from the RF antenna to the third port of the second magic tee;

a second RF switch RF coupled to the second port of each of the first and second magic tees, the second RF switch having an output port and being selectively operable to couple RF signals from a selected one of the second ports of the first and second magic tees to the output port;

a third RF switch RF coupled to the RF generator and having first and second output ports, the third RF switch being selectively operable to couple RF signals from the RF generator to a selected one of its first or second output ports;

a first RF null circuit RF coupled between the fourth port of the first magic tee and the first output port of the third RF switch; and a second RF null circuit RF coupled between the fourth port of the second magic tee and the second output port of the third RF switch, each one of the first and second RF null circuits supplying a respective co-linear RF null signal to the fourth port of the first or second magic tee coupled therewith when the first RF switch is selectively operated to couple the RF signal from the RF generator to said magic tee coupled therewith and when the third RF switch is selectively operated to couple RF signals from the RF generator to the other one of the first or second RF null circuits and supplying a respective cross-polarized RF null signal to the fourth port of the first or second magic tee coupled therewith when the third RF switch is selectively operated to couple RF signals from the RF generator to said one of the first and second RF null circuits and when the first RF switch is selectively operated to couple the RF signal from the RF generator to the magic tee coupled with the other one of the first and second RF null circuits, the co-linear and cross polarization RF null signals being effective to cancel residual RF reflections in the radar system, whereby selective operation of the first, second and third RF switches provides an RF output from the output port of the second RF switch which selectively provides a measurement of the co-linear and cross-polarization characteristics of the target, wherein the RF signal at the output of the second RF switch is free from residual RF reflections in the radar system for each of the vertical, horizontal and cross-polarization measurements.

* * * * *